(12) United States Patent
Lair

(10) Patent No.: US 7,484,356 B1
(45) Date of Patent: Feb. 3, 2009

(54) CASCADE REVERSER WITHOUT BLOCKER DOORS

(75) Inventor: Jean-Pierre Lair, San Antonio, TX (US)

(73) Assignee: Aeronautical Concepts of Exhaust, LLC, San Antonio, TX (US)

( * ) Notice: Subject to any disclaimer, the term of this patent is extended or adjusted under 35 U.S.C. 154(b) by 127 days.

(21) Appl. No.: 11/491,890

(22) Filed: Jul. 24, 2006

Related U.S. Application Data

(60) Provisional application No. 60/702,683, filed on Jul. 26, 2005.

(51) Int. Cl.
F02K 3/02 (2006.01)

(52) U.S. Cl. .................................... 60/226.2; 60/230

(58) Field of Classification Search ............... 60/226.2, 60/230
See application file for complete search history.

(56) References Cited

U.S. PATENT DOCUMENTS

| | | | |
|---|---|---|---|
| 3,599,432 A * | 8/1971 | Ellis | 60/226.1 |
| 4,232,516 A * | 11/1980 | Lewis et al. | 60/226.2 |
| 4,716,724 A * | 1/1988 | Newton | 60/226.2 |
| 4,731,991 A * | 3/1988 | Newton | 60/226.2 |
| 5,228,641 A * | 7/1993 | Remlaoui | 244/110 B |
| 5,507,143 A * | 4/1996 | Luttgeharm et al. | 60/226.2 |
| 6,148,607 A * | 11/2000 | Baudu et al. | 60/226.2 |
| 6,170,253 B1* | 1/2001 | Newton | 60/226.2 |
| 6,256,980 B1* | 7/2001 | Lecordix et al. | 60/226.2 |
| 6,385,964 B2* | 5/2002 | Jean et al. | 60/226.2 |
| 6,439,504 B1* | 8/2002 | Ahrendt | 244/110 B |
| 6,625,972 B1* | 9/2003 | Sternberger | 60/226.2 |
| 6,684,623 B2* | 2/2004 | Langston et al. | 60/226.2 |
| 6,895,742 B2* | 5/2005 | Lair et al. | 60/226.2 |
| 7,124,981 B2* | 10/2006 | Parham | 244/110 B |
| 2003/0056493 A1* | 3/2003 | Jannetta et al. | 60/226.2 |
| 2003/0066284 A1* | 4/2003 | Chakkera et al. | 60/226.2 |
| 2004/0231317 A1* | 11/2004 | Dehu et al. | 60/223 |

* cited by examiner

*Primary Examiner*—William H Rodríguez
(74) *Attorney, Agent, or Firm*—James J. Murphy; Thompson & Knight LLP

(57) ABSTRACT

A translating cowl composed of two sub-structures forms the thrust reverser for a turbofan engine. The two sub-structures form the rear part of a nacelle, are translatable, and have operative and inoperative modes of operation. The operative mode is used for direct or reverse thrust operation of the engine and the inoperative mode is used for access to the engine.

7 Claims, 7 Drawing Sheets

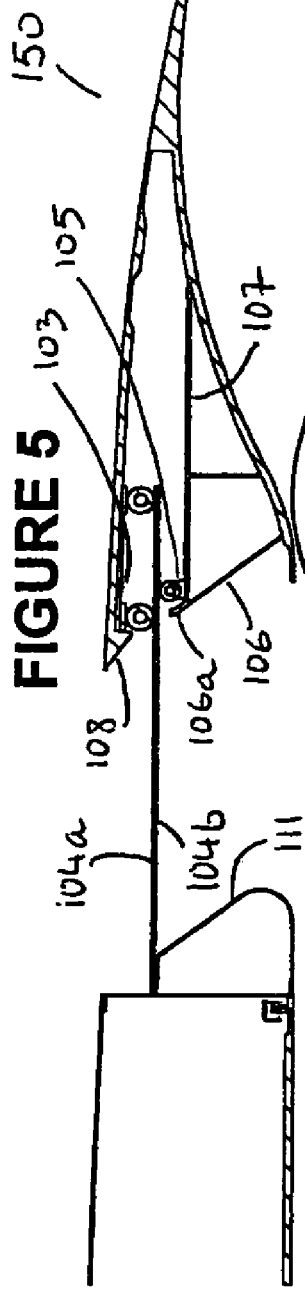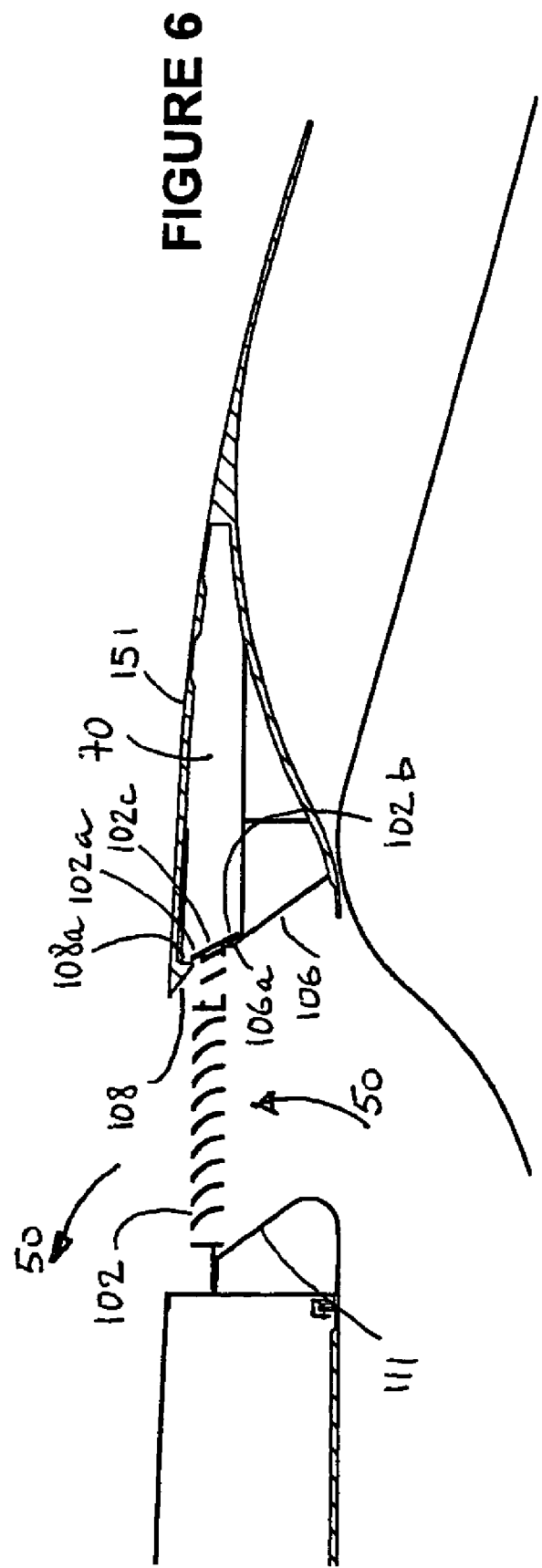

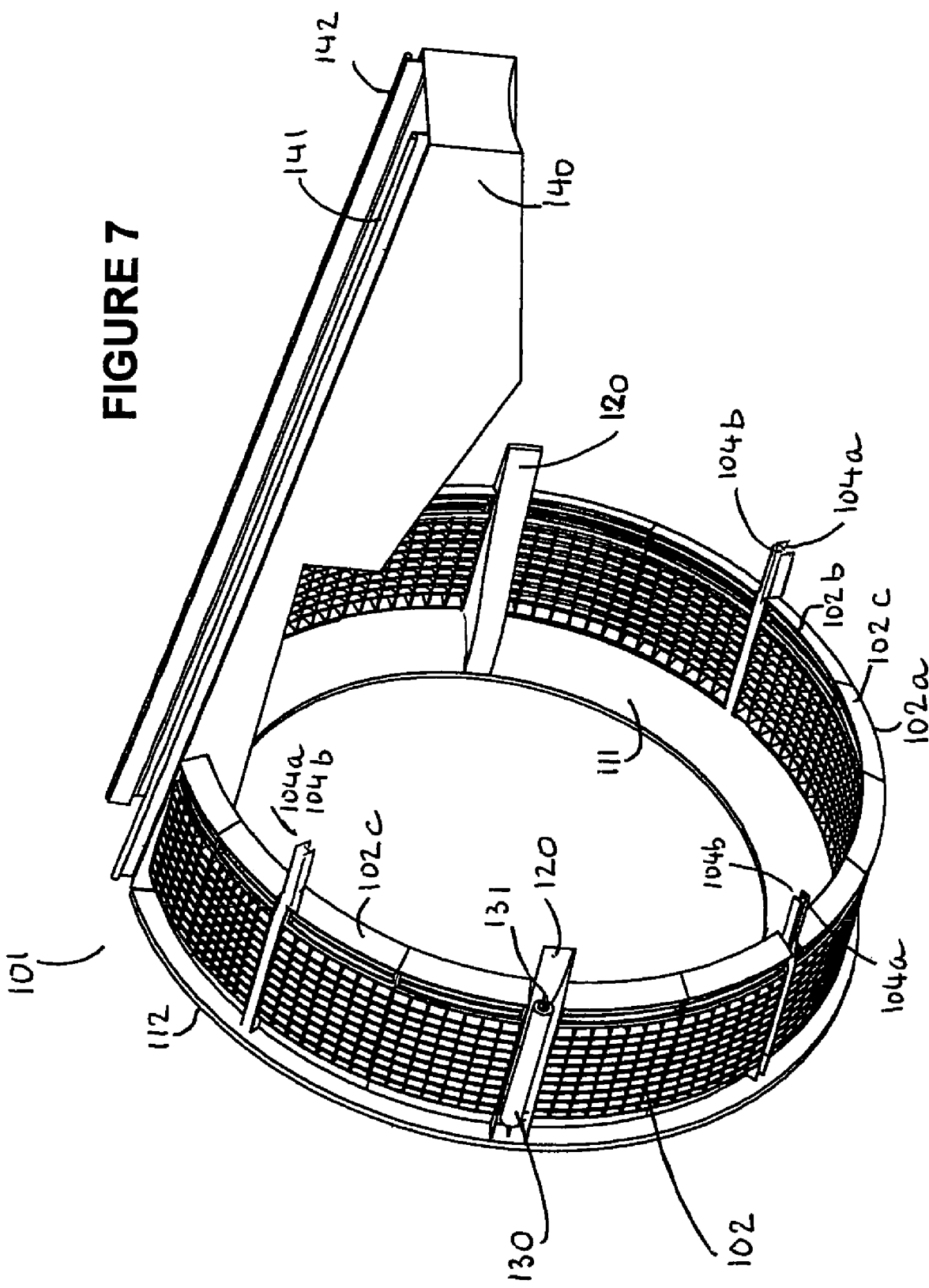

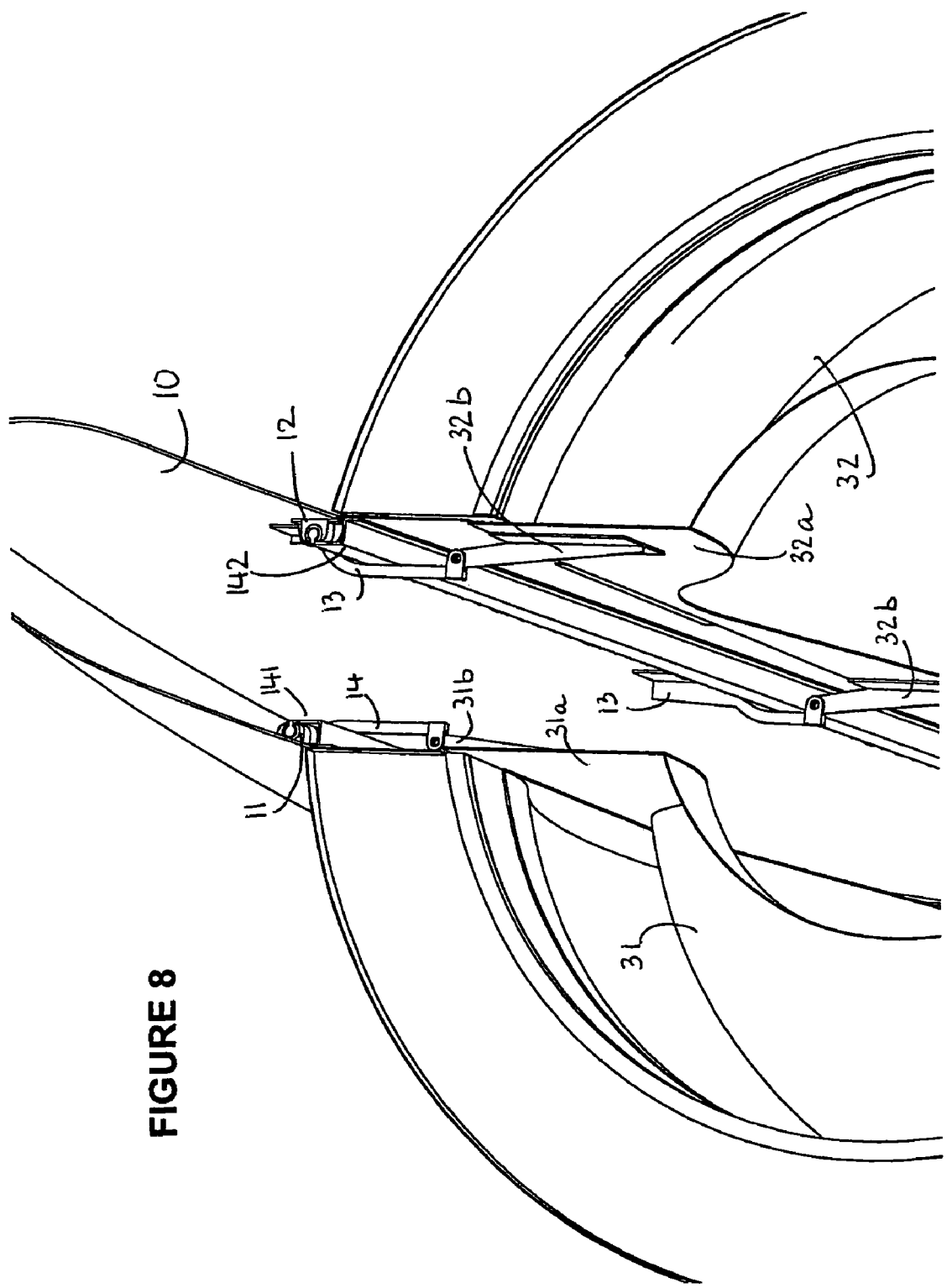

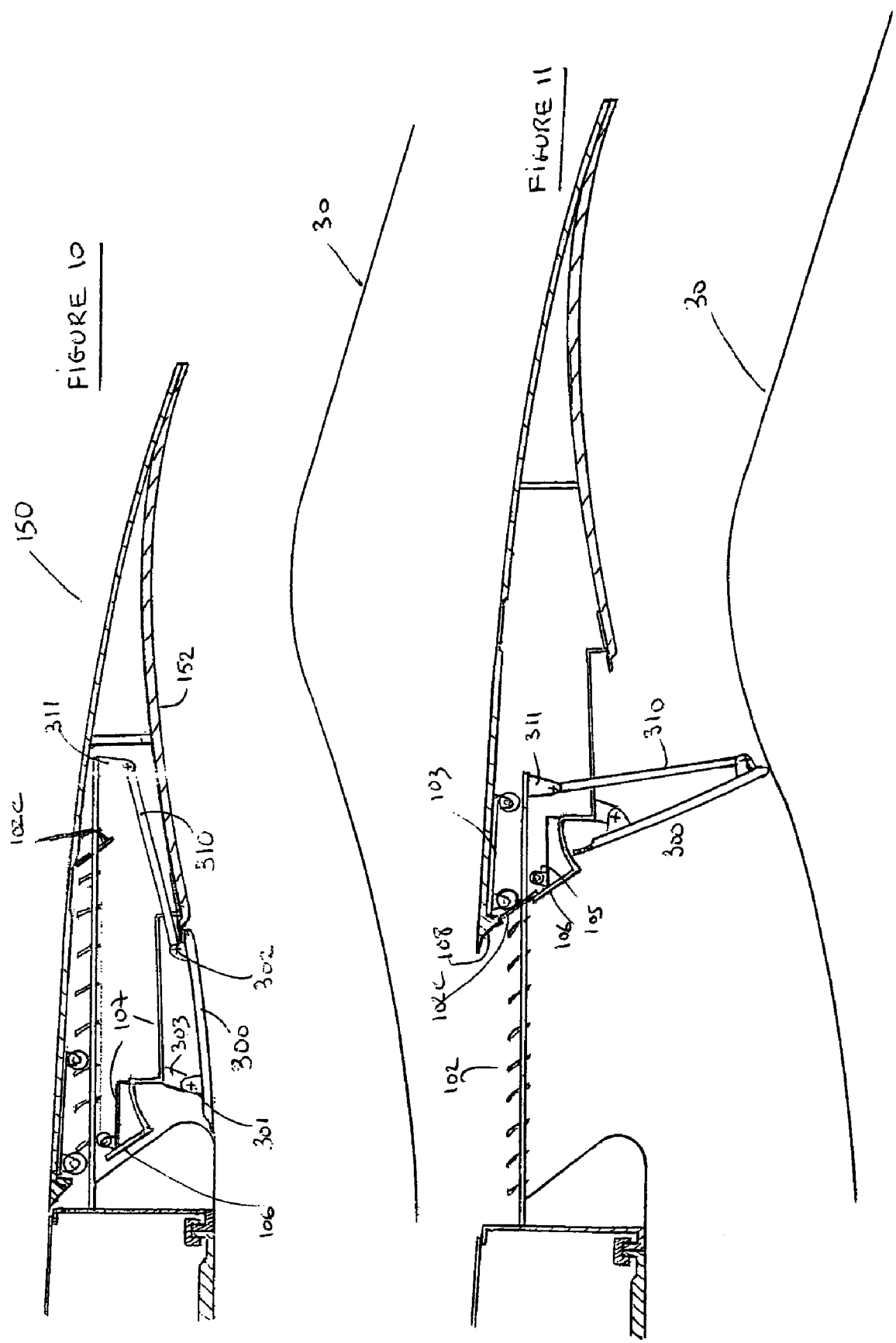

CASCADE REVERSER WITHOUT BLOCKER DOORS

CROSS-REFERENCE TO RELATED APPLICATION

The present application claims priority to U.S. Provisional Patent Application Ser. No. 60/702,683.

FIELD OF INVENTION

The present invention relates in general to aircraft engines, and in particular, to a fan thrust reverser for aircraft gas turbine engines.

BACKGROUND OF INVENTION

Turbofan engines are well known. They are typically composed of a fan driven at the front of the engine that draws air rearwardly through a by-pass duct that is defined by the core engine cowling and by the fan cowling spaced outwardly from the core cowling. In the case of a short nacelle, i.e., a separate flows nacelle, the generally annular duct that is bounded by the inner core cowling and the outer fan cowling, channels the by pass flow only while the core flow is channeled by the core nozzle inwardly installed to the core cowling. In the case of a long nacelle, i.e., a confluent flows nacelle, the upstream portion of said annular duct channels the by-pass flow only and its downstream portion channels the by-pass flow and the engine core flow.

Landing speeds of modern aircraft being typically high, it is of great importance to assist the wheel braking for the deceleration of the aircraft by enhancing its stopping capability using aerodynamics means. Aerodynamics decelerating means have a positive economic impact in helping reduce the wear on the wheel brakes but more important contribute to enhancing the aircraft safety at landing on wet or icy runways. However, since thrust reversers are only used approximately 30 seconds of the flight, it is essential that said reversers be of light weight and simple so that the cruise performance and the operational characteristics of the aircraft are not affected by the thrust reverser.

Thrust reversers being commonly used on aircraft are very well known. Generally speaking, they can be categorized into two categories. The first one called also fan reversers is the type of reversers that reverse the by-pass flow only and the second one the type that reverses the by-pass and the core flows. Since the second category leads to a more complex, a heavier structure and can only be installed on confluent flows engine, this type will not be considered in this invention.

The known prior art fan thrust reversers can be, generally speaking, categorized in three distinct types. First type consists in the aft axial translation of the by-pass structure for the deployment of a series of blocker doors inside the by-pass duct structure and the opening of an aperture in conjunction with the exposing of radial cascade vanes for redirecting the by-pass flow in the forward direction. The second type uses also the aft axial translation of the by-pass structure for closing the by-pass flow duct and opening of an aperture for re-directing the by-pass flow in the forward direction. Said aperture of prior art may or may not be equipped with cascades vanes. The second type differs from the first one, as the series of blocker doors is no longer present. The third type consists of doors that rotate inside the bypass flow and outside in the ambient air for re-directing the by-pass flow in the forward direction. This fan reverser type is generally called "petal" or "pivoting doors" reverser.

The drawbacks of the first type prior art fan reversers are the necessity to provide aft translation capability to two roughly symmetrical but distinct cowlings for reversing the fan flow, and the presence in the by-pass duct of links, known as drag links, for the deployment of the series of blocker doors. The drag links are degrading the engine performance in forward thrust, the blocker doors are increasing the complexity and the weight of the assembly and finally the required guiding, and sliding tracks for reverser operation of the two roughly symmetrical but distinct halves are significantly increasing the weight of the nacelle. Each of the two symmetrical halves forms a D-duct that is hinged on each side of the aircraft pylon. Each D-duct can be separately pivotally opened around its hinges, with a dedicated actuator per D-duct for maintenance access to the engine. When the D-ducts are closed and latched they are sized for reacting the required engine operational aerodynamic static pressure acting inside the D-ducts. This type of structural arrangement contributes to significantly increasing the overall weight of the assembly because of the structural discontinuity between the two halves. The D-duct configuration impacts weight, reliability, number of parts and cost.

While the second type of fan reverser appears to be an improvement, since the drag links and the associated series of blocker doors have been eliminated, its drawback is that it still necessitates the translation capability of two roughly symmetrical but distinct cowlings for reversing the fan flow. The previous described drawbacks are then still valid for this configuration. Typical cascade reverser of this type is disclosed in U.S. Pat. No. 6,438,942 and U.S. Pat. No. 6,568,172

Although the third type appears to be an improvement over the first and second types, its main drawback is the presence of wells in the by-pass duct for housing of the actuators that control the pivoting of the doors. The forward engine performance degradation that is associated to these wells usually requires additional flaps mechanism for fairing them. Other drawbacks of this type of fan reverser are the required large actuators stroke and the extensive protrusion of the pivoting doors in the ambient air when they are pivoted to their deployed position. The required large number of latches drives significantly the complexity of the system and control for this type of reverser.

In sum, the need has arisen for improved techniques for providing a low weight cascade fan reverser for a turbofan engine. Among other things, such techniques should provide for the elimination of D-ducts and/or blocker doors. Further, these techniques preferably optimize direct thrust performance of the engine and provide a clean aerodynamic boundary flow surface for the outer cowling of the by-pass duct. Additionally, the number of actuators of the reverser should be reduced for further weight and cost reduction and techniques found that allow the reverser assembly to be moved rearward for access to the engine.

SUMMARY OF INVENTION

A translating cowl that is composed of two sub-structures forms the thrust reverser of the invention for a turbofan engine. The two sub-structures form the rear part of the nacelle. The two substructures are translatable and are defined as having two modes of operation: an operative mode and an inoperative mode. The operative mode is the one that is used for direct or reverse thrust operation of the engine. The inoperative mode is the one that is used for access to the engine.

In the operative mode and in direct thrust operation of the engine, the two sub-structures, a forward, and a rear structure are latched together, the rear structure being supported by supporting and guiding rails structurally attached to the forward structure. The two substructures form a single structure that we will call O-duct by opposition to a D-duct that is formed by two separate structures.

The forward structure of the O-duct is mechanically secure to the engine fan case via any suitable means.

Still in the operative mode but in the reverse thrust operation of the engine, the two substructures of the translating cowl have been unlatched so that the rear structure can be moved rearward, away from the forward structure. The forward structure has not moved as it is still securely mechanically secured to the engine fan case. As the rear structure of the translating cowl is moving rearward on its first double track to reach its maximum rearward position, the rear structure uncovers an opening that defines the reverser nozzle inside which is installed a series of cantilevered cascades that are fitted with a plurality of turning vanes for redirecting the reverse flow through the reverser nozzle. The cascades are mechanically attached to the forward structure of the translating cowl. The axial translation of the rear structure is enabled thanks to a plurality of guiding first double tracks that are attached to the forward structure, that are sandwiched between the cascade elements and that are cantilevered to the cascade elements.

Also in its rear position, the rear structure of the translating cowl has its upstream end that cooperates with the fixed core cowl for substantially blocking the fan duct and allowing the fan flow to discharge via the cascade assembly through the reverser nozzle. The rear structure of the translating cowl is formed of an outer and an inner skin that form a cavity in substantially their forward half and that are joined together in substantially their rear half. In substantially its forward half the inner skin is supporting a structure that forms an inner deflecting wall and that holds the means that cooperate with the inner track of the first double track. In substantially its forward half the outer skin is supporting a structure that forms an outer deflecting wall and that holds the means that cooperate with the outer track of the first double track The actuation means for the operative mode of the translating structure is preferably electromechanical and consists of at least one electro-mechanical actuator located on the forward structure of the translating cowl.

In the inoperative mode the rear and forward structures of the translating cowl are latched together, and the translating cowl is unsecured from the engine fan case. The translating cowl is now enabled to be translated rearward on the pylon for access to the engine thanks to the second track that is mechanically attached to the engine pylon.

There is no necessity for providing a specific actuation means for the inoperative mode of the translating cowl, as a single man can move it manually. However, if the engine manufacturer or the aircraft manufacturer would want a specific means for this mode of operation of the translating cowl, then it would be preferably electromechanical and consists of one electric motor located in the engine pylon substantially toward its trailing edge. The motor would be configured to cooperate with a rack that would be mechanically attached to the rear structure of the translating cowl and located substantially underneath the pylon.

BRIEF DESCRIPTION OF DRAWINGS

For a more complete understanding of the present invention, and the advantages thereof, reference is now made to the following descriptions taken in conjunction with the accompanying drawings, in which:

FIG. 5 is a schematic section view taken on line B-B showing the translating cowl in its second operative mode, the thrust reverser is in the reverse thrust operation of the engine;

FIG. 6 is a schematic section view taken on line C-C showing the translating cowl in its second operative mode;

FIG. 7 is a perspective view of the forward structure of the translating cowl;

FIG. 8 is a perspective view showing the translating cowl supported by the engine pylon;

FIG. 10 is a schematic view of an alternate embodiment of the invention showing blocker doors, the translating cowl is in its first position; and FIG. 11 is a schematic view of FIG. 10 with the translating cowl in its second position.

DETAILED DESCRIPTION OF THE INVENTION

The principles of the present invention and their advantages are best understood by referring to the illustrated embodiment depicted in FIGS. 1-11 of the drawings, in which like numbers designate like parts.

Figure 1:
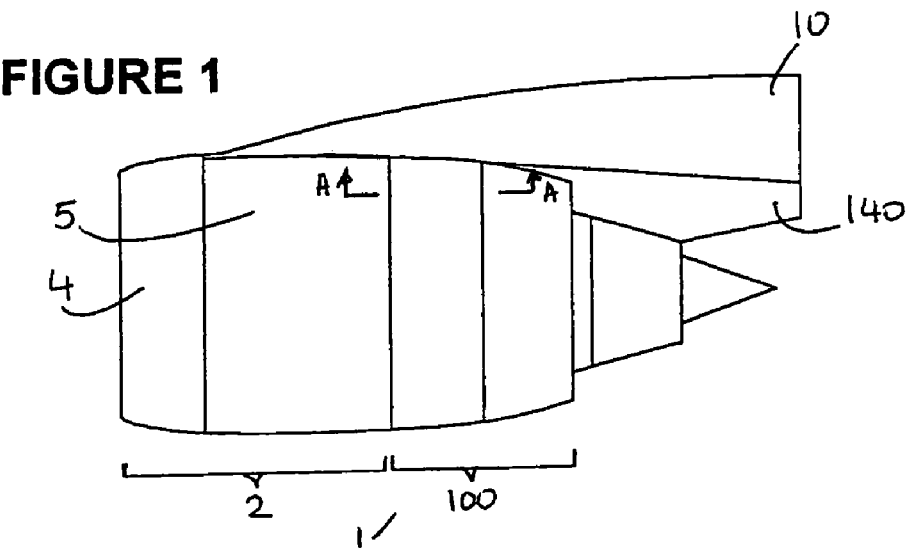
FIG. 1 is a schematic side view of an exemplary turbofan engine that includes a fan thrust reverser in accordance with the present invention, the translating cowl of the invention is in its first position.
Figure 2:
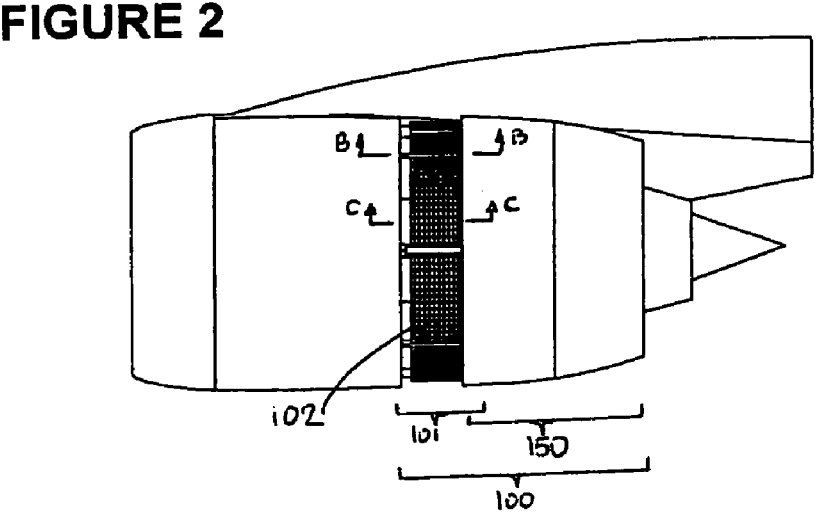
FIG. 2 is a side view of FIG. 1 with the translating cowl of the invention in its second position.

With reference to FIG. 1 the turbofan engine is housed by a nacelle 1 and is supported by a pylon 10 mounted on an aircraft. The nacelle 1 includes a forward portion 2 and a rear portion 100. The forward portion typically forms the air inlet 4 and the fan cowling 5. The rear portion 100 houses the thrust reverser and is composed of a translating cowl defined by a forward structure 101 and a rear structure 150 (FIG. 2). As it will be described, the forward and the rear structures have an operative mode that corresponds to the direct or reverse thrust modes of operation of the engine and an inoperative mode that corresponds to the access to the engine. FIG. 1 shows the operative mode of the translating cowl in its forward thrust position. FIG. 2 shows the operative mode of the translating cowl in its reverse thrust position: the position of the forward structure 101 has remained fixed, while the rear structure 150 has been translated rearwards uncovering a series of cascades 102 that are structurally attached to and part of the forward structure 101. The cascades 102 are conventional in the sense that they include a series of transverse turning vanes (FIG. 6) for assisting the redirecting of the fan flow when the rear structure is in the position shown in FIG. 2.

Figure 4:
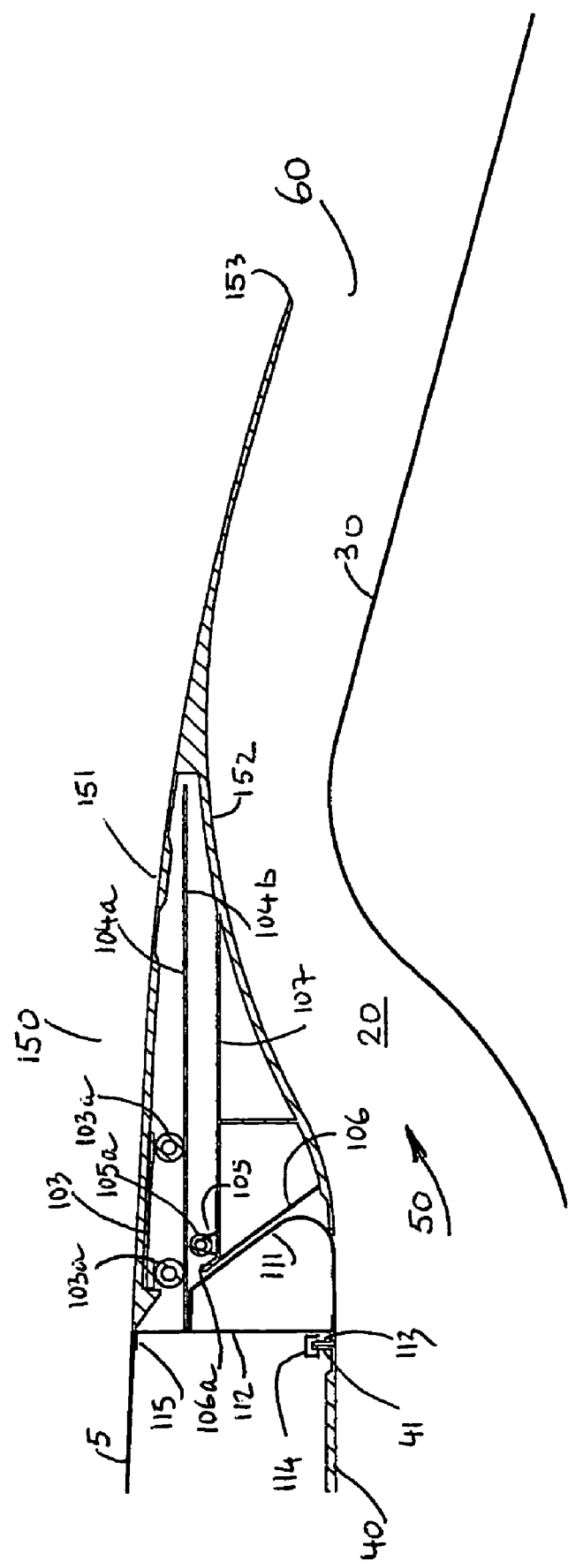
FIG. 4 is a schematic section view taken on line A-A showing the translating cowl in its first operative mode, the translating cowl is in the direct thrust operation of the engine.
Figure 9:
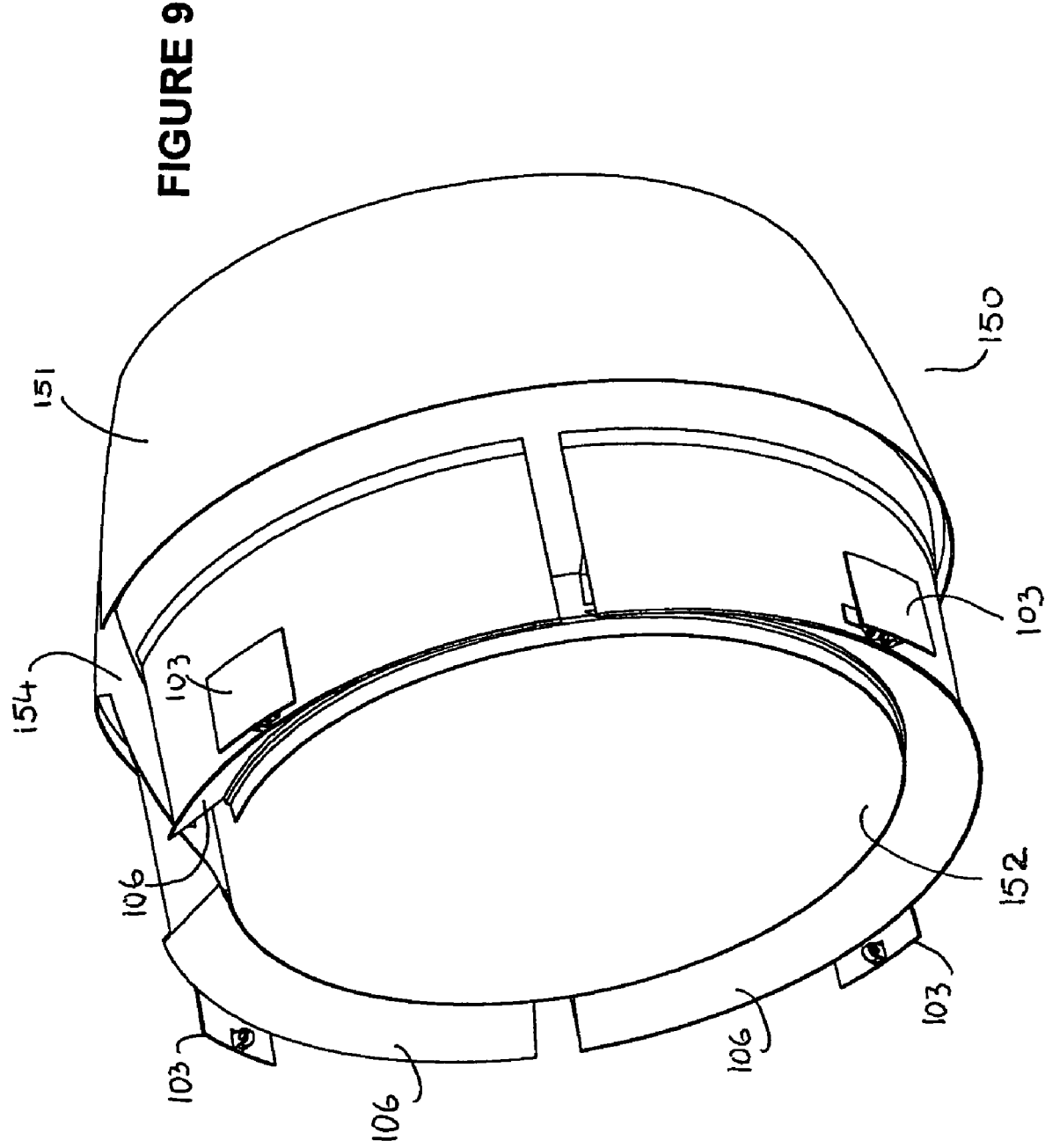
FIG. 9 is a perspective view showing the rear structure of the translating cowl (portion of the outer skin is removed for clarity)

Referencing to FIGS. 4 and 7 the forward structure of the translating cowl is composed of a bull nose 111 structurally attached to a forward radial frame 112. A radial flange 113 attaches structurally to the bull nose and the radial frame. In the first and second position of the translating cowl, radial flange 113 mates with opposite radial flange 41 of the engine fan case 40. For these two positions, i.e., the operative mode of the translating cowl, radial flanges 41 and 113 are mechanically secured together by for example a radial V-clamp type 114. A radial lip 115 attaches to the radial frame 112 In the vicinity of its outward extremity. This lip serves the function of a landing to the fan cowl 5 when the translating cowl is in its operative mode. More clearly depicted on the perspective view shown by FIG. 7, a series of cascade elements 102 are structurally attached to the bull nose 111 and the forward radial frame 112. The cascades elements sandwich a series of cantilevered first double track 104a, 104b, as well as at least one housing structure 120 for the actuation means 130 for the operative mode of the translating cowl. Actuation means 130 is preferably an electro-mechanical actuator with its cylinder mechanically attached to its housing 120 that is part of the forward structure of the translating cowl and the rear extremity of its piston rod 131 mechanically attached to the rear structure of the translating cowl. Since the translating cowl forms an O-duct that is supported and guided by the series of first double tracks 104a, 104b circumferentially distributed around the periphery of the forward structure of the translating cowl, it is a characteristic of this invention that potentially only one actuation means and certainly not more than two are required for moving rear structure 150 of the translating cowl to its two operative positions.

Figure 3:
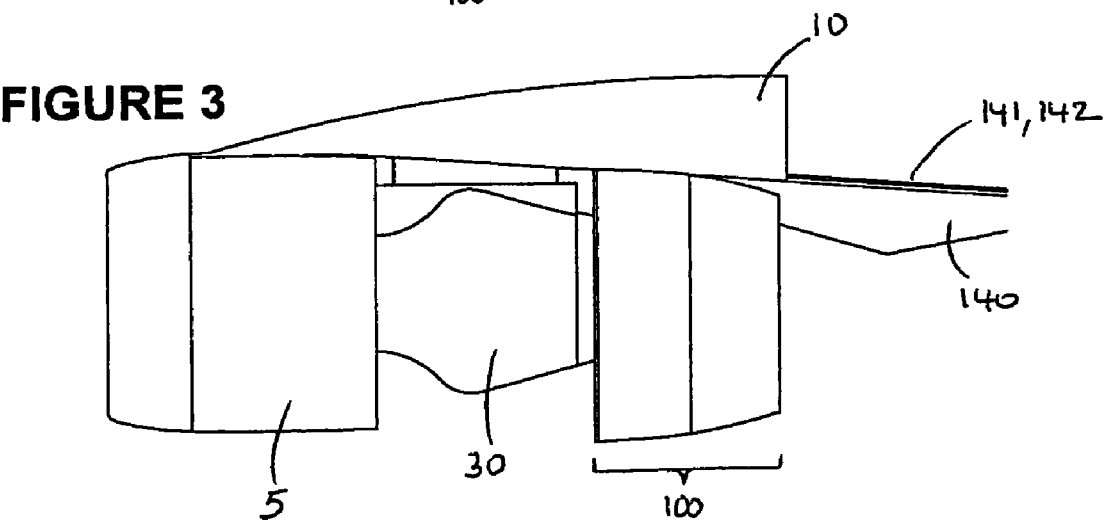
FIG. 3 is a side view of FIG. 1 with the translating cowl of the invention in its third position.

The series of cascades elements sandwich also a cantilevered structure 140 on which is structurally attached rails 141 and 142 that engage corresponding mating rails 11 and 12 secured to the engine pylon 10 (FIG. 8). The railing system of the invention is totally independent and fulfills two different functions. First function is for the operative mode of the translating cowl while the second function is for the non-operative mode of the translating cowl. The operative mode uses a series of single double tracks 104a, 104b sandwiched by the series of cascades elements, rearwardly cantilevered on them, and running substantially parallel to the engine centerline. The inoperative mode uses two single tracks 11 and 12 secured to the engine pylon 10 and running in a plane that preferably converges towards the engine centerline (FIG. 3).

The rear structure 150 is composed of two skins (FIG. 4), an outer skin 151, and an inner skin 152. The outer skin 151 forms surface continuity with the upstream fan cowl 5 when the rear structure 150 is in the position of FIGS. 1, 4. Still referring to FIG. 4 the inner skin 152 is radially located outwardly of the core cowl 30 to form the by-pass duct 20 for channeling of the gaseous fan flow 50 that exits at the by-pass exhaust 60. In substantially their forward half, the outer and inner skins respectively 151, 152 form a cavity 70 inside which is housed most of the structural elements of the forward structure of the translating cowl. In substantially their rear half, the inner and outer skins are radially joined together to form the trailing edge 153 of the by-pass duct. Two opposite parallel walls 154 (FIG. 9) longitudinally close the inner and outer skins for forming the O-duct.

Referencing to FIGS. 4, 5, 6 and 7, the rear structure 150 is supported and guided by a plurality of double tracks 104a, 104b that form part of the forward structure of the translating cowl. The double tracks are mechanically attached to the bull nose 111, the forward frame 112 and are sandwiched between two adjacent cascade sets 102. Referencing to FIGS. 4, 5, 6 and 9 on the inner surface of the outer skin 151 is secured a series of carriages 103 fitted with rollers 103a. The rollers 103a are supported and guided by the outer track 104a. An outer deflector 108 is mechanically attached to the inner surface of the outer skin 151 in the vicinity of its forward end. The outer deflector 108 has a lip 108a that extends radially inwardly as close as possible to the outer surface of each cascade element. On the inner skin 152 is attached an inner deflector 106 that is substantially parallel to the bull nose wall 111. The other extremity of the inner deflector forms a lip 106a, that extends radially outwardly and that is as close as possible to the inward side of the cascades elements. Wall 107 supports the deflector 106 towards its lip 106a. The forward extremity of wall 107 is structurally attached to the inner deflector while its rear extremity is attached to the inner skin 152. Wall 107 supports a carriage 105 that holds at least one roller 105a that is supported and guided by the inner track 104b. In this manner and as is shown on FIGS. 4, 5 and 7 the rear structure 150 is well supported and guided by the plurality of first double tracks 104a, 104b.

Referencing to FIG. 6, the rear wall 102c of each cascade elements has an inward extension 102b and an outward extension 102a. It is a characteristic of this invention that the inward and outward extensions respectively cooperate with lips 106a and 108a of the inner and outer deflectors. In this manner, when the translating cowl is positioned to its reversing position, the cavity 70 is closed and not subjected to the reverse flow. It is also a characteristic of this invention that the walls 106, 102c and 108 are substantially collinear when the translating cowl is in its second position or reversing position. To increase the reversing efficiency, the angle formed by this series of walls is preferably less than the angle formed by wall 111 of the bull nose.

Referencing to FIG. 3 the complete translating cowl 100, i.e., its forward and rear structures respectively 101, 150 and of course all of the actuation means for the operative mode have been moved rearward for maintenance access to the engine. To achieve this, the opening of fan cowl 5 pivotally mounted on the engine pylon and composed of two halves (shown in the closed position on the figure) gives access to the clamp 114 that can be undamped, allowing the translating cowl to slide rearward on its railing 141, 142 that is guided by the associated tracks 11 and 12 secured to the engine pylon 10. The core cowl 30 is composed of two radial halves 31, 32 (FIG. 8) on which is secured two longitudinal walls 31a, 32a, each one holding a series of fittings 31b, 32b pivotally mounted respectively on series of fittings 13, 14 mechanically attached to the engine pylon 10. When the translating cowl 100 is in its third position, as shown by FIG. 3, each half 31, 32 of the core cowl 30 can be pivotally opened for maintenance access to the engine. With the fan cowls 5, the core cowls 30 pivotally opened and the translating cowl 100 in its third position, then, the turbofan engine can be removed from the engine pylon.

FIGS. 10, 11 show an alternate embodiment of the invention. The inner skin 152 of the rear structure of the translating cowl is fitted in its forward extremity of a series of blocker doors 300 pivotally mounted in their upstream extremity to a hinge fitting 301 that is pivotally mounted on pivot fitting 303 that is mechanically attached to support 107 of inner deflector 106. In their rear extremity each blocker door is connected to a link 310 on clevis 302 while the other extremity of the link is connected to a series of cantilevered hinge fittings 311 mounted downstream of the rear cascade rear wall 102c. The operation of the actuation means of the rear part of the translating cowl forces the series of blocker doors to swing to their closed position (FIG. 10) for the first position of the translating cowl, or to their opened position (FIG. 11) with their rear extremity to cooperate with the core cowl 30 for closing of the by-pass duct. In this position, it is a characteristic of this embodiment that the series of blocker door 300, the inner deflector 106, the rear wall 102c of the cascades elements and the outer deflector 108 are substantially collinear. As for the preferred embodiment of this invention, in its third position, the complete translating cowl, including its actuation means can be moved rearward for maintenance access to the engine. The corresponding figure is then FIG. 3.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A translating cowl providing a thrust reverser for a turbofan engine comprising:
   a rail mechanism;
   first and second translatable sub-structures coupled to the rail mechanism and forming a rear portion of a nacelle, wherein:
   in an operative mode, the first translatable sub-structure translates along the rail mechanism independent of the second translatable sub-structure thereby allowing a selected one of direct and reverse thrust operations of the turbofan engine; and
   in an inoperative mode, the first and second translatable structures translate along the rail mechanism together thereby allowing access to the turbofan engine.

2. The translating cowl of claim 1, wherein the first translatable sub-structure translates to a forward position along the rail mechanism and the second translatable structure remains in a forward position in the operative mode to thereby allow direct thrust operations.

3. The translating cowl of claim 1, wherein the first translatable sub-structure translates to an intermediate rearward position along the rail mechanism and the second translatable structure remains in a forward position in the operative mode to thereby allow reverse thrust operations.

4. The translating cowl of claim 1, wherein the first and second sub-structures translate together to a rearward position along the rail mechanism in the inoperative mode thereby allowing access to the turbofan engine.

5. The translating cowl of claim 1, wherein the rail mechanism comprises:
   a first sub-rail mechanism integral with the second translatable sub-structure and upon which the first translatable sub-structure translates in the operative mode; and
   a second sub-rail mechanism upon which the first and second translatable sub-structures translate in the in operative mode.

6. The translating cowl of claim 5, wherein the second sub-rail mechanism is adapted for mounting on an engine pylon.

7. The translating cowl of claim 1, wherein the second translatable sub-structure comprises cascades.

* * * * *